United States Patent Office 3,410,338
Patented Nov. 12, 1968

3,410,338
THERMAL CONDUIT COUPLING FOR HEAT STORAGE APPARATUS
Willis Thompson Lawrence, Arlington, Mass., assignor, by mesne assignments, to Hooker Chemical Corporation, Niagara Falls, N.Y., a corporation of New York
Filed Nov. 7, 1966, Ser. No. 592,477
6 Claims. (Cl. 165—47)

ABSTRACT OF THE DISCLOSURE

A coupling device especially adapted to withstand the thermal stress induced between the heat transfer fluid conduit and the container for an alkali metal hydroxide heat storage composition when the heat transfer fluid at a relatively low temperature enters initially into heat transfer relationship with the storage medium. The coupling device comprises a tubular sleeve through which the heat transfer fluid conduit passes. The tubular sleeve is sealed at one end of the container wall and at the other end to the heat transfer fluid conduit in such a manner as to form an insulative space around the conduit and provide for stress relief from expansion and contraction.

---

Figure 1:
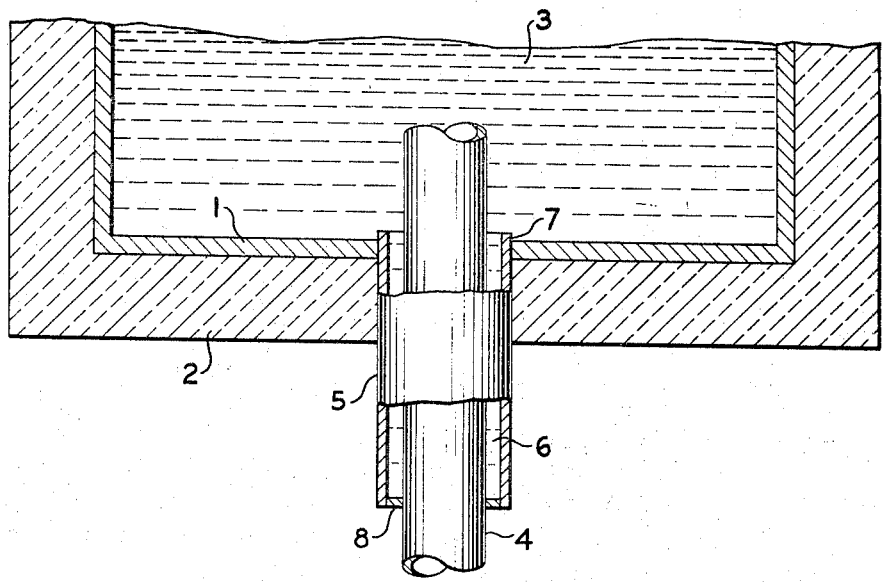

This invention relates to heat transfer apparatus of the type comprising a container of heat-storage material, and a conduit which extends through the container and material, and through which conduit water or other heat exchange fluid is circulated for heating, as for example, a heat transfer system for heating water such as is disclosed in my application Ser. No. 592,476, filed Nov. 7, 1966.

Among the most effective materials for heat storage are the alkali metal hydroxides, such as sodium hydroxide, containing corrosion inhibiting means, such as additional passifying chemicals. Alkali metal hydroxides have extremely high heat storage capacities over a wide temperature range from about 100 to 1200 degrees Fahrenheit. Such compositions are fluid over the higher part of this temperature range, that is above about 500 degrees Fahrenheit, and therefore, to prevent leakage, the container is preferably sealed around the heat exchange conduit where it enters the container. The container and conduit, for reasons of economy and corrosion control, are preferably made of steel, preferably low carbon steel, to thereby obtain good corrosion control characteristics, thermal conductivity and economy. The water or other heat exchange fluid passed through the conduit for heating is usually at a relatively low temperature, for example about 35 to 150 degrees Fahrenheit, as compared to the highest temperatures of the heat-storage material, the container and the conduit therewithin.

When water at such a relatively low temperature is introduced into a conduit at about 900 degrees Fahrenheit, severe temperature gradients and accompanying thermal stresses may be produced in the conduit, causing thermal shock, structural fatigue and ultimately, metal failure. Use of heat-storage material of low thermal conductivity, such as alkali metal hydroxide materials, helps to reduce these stresses in the conduit to an acceptable level. However, problems arise at the place where the conduit enters the heat storage container and also where it is joined to the container wall. The container, being made of a relatively highly thermally conductive material, such as steel, has its heat content withdrawn rapidly from the region around the condudit. High stresses are thus produced, and if the conduit is rigidly or directly mounted to the container, failure may occur in the conduit, the container wall, or at the place of attachment.

Objects of the present invention are to provide a coupling for the conduit and container wall which permits water or other fluid to be introduced into the conduit at relatively low temperatures compared to the heat storage material without producing unacceptable thermal stresses in the conduit, container wall, or place of attachment thereto, which is simple and economical to produce and which is durable and reliable in use.

In accordance with the invention, a heat transfer apparatus is provided comprising a container of high thermal conductivity, a relatively low heat conductivity, high-temperature, heat-storage material in said container, and a conduit of high heat conductivity extending through said container and said heat storage material and into which a fluid at a relatively low temperature with respect to the heat storage material is introduced for heating, a coupling device for securing said conduit to the wall of said container comprising a tubular sleeve surrounding said conduit, means for securing and sealing one end of said sleeve to the conduit and the other end of said sleeve to the container wall, said sleeve forming a space around said conduit for insulative means in said space, whereby said sleeve follows the contractions and expansions of the conduit at the end secured thereto, and whereby thermally induced stresses in said conduit and container wall are reduced.

Preferably said sleeve extends outside of the container, said space communicates with the interior of the container and said insulative means comprises the lower heat conductive heat-storage material. In a like manner, said sleeve may extend inside the container with said space in communication with the exterior of the container, and said insulative means may comprise air or other suitable insulator.

Figure 2:
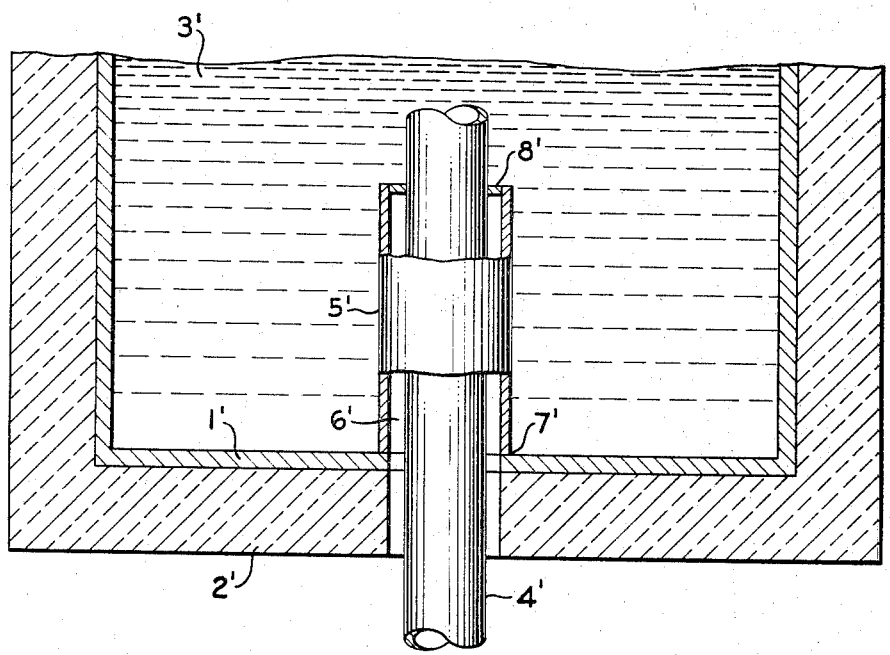

For the purpose of illustration, typical embodiments of the invention are shown in the accompanying drawing in which:

FIG. 1 is a sectional view illustrating the preferred embodiment of the invention; and FIG. 2 is a similar sectional view illustrating another embodiment of the invention.

As referred to herein, high conductivity means good thermal conductivity, such as that of free metals and alloys such as steel, whereas low conductivity means poor thermal conductivity as is found in solid forms in most inorganic salts.

The preferred embodiment of the invention illustrated in FIG. 1 is shown used with a tank or container wall 1 made of a high thermally conductive material, such as low carbon steel, covered with insulation 2. In the container is heat-storage material 3 of relatively low thermal conductivity, compared to container wall 1, such as sodium hydroxide preferably containing a corrosion inhibitor or passifying chemicals as are known to the art. Tubular conduit 4, also made of a relatively high thermally conductive material such as low carbon steel passes through an opening in the wall of the container 1 into the material 3 where it may, for instance, form a coil or other desirable heat transfer structure. Water or other heat exchange fluid at a relatively low temperature compared to the heat storage material, such as about 35 to 150 degres Fahrenheit is introduced into the conduit 4 for heating. The coupling device of this invention comprises a tubular sleeve 5, which may also be low carbon steel, surrounding the conduit 4 and leaving a space 6 therebetween. At end 7 of the sleeve there are attachment means, such as welding, for securing and sealing the container wall 1 to the sleeve. Similar attachment means secure and seal the conduit to the other end 8 of the sleeve.

In this embodiment, sleeve 5 extends outside the container, through the insulation 2 and into air outside the container. Thus the outside end of the sleeve is held at a lower temperature than the container wall 1, thereby reducing the possibility of high temperature gradients and stresses in the conduit and container by spreading the temperature change over a greater distance.

The space 6 formed around the conduit by the sleeve and container wall communicates with the interior of the container and is thus occupied by the low conductivity material 3 which acts as an insulative means and therefore prevents heat from conducting rapidly from the container wall to the conduit. Thus at the end of the sleeve connected to the container wall, no thermal stresses will be developed which would tend to break the sleeve from, or cause failure in, the container wall.

The sleeve 5 follows, without producing unacceptable stresses, the contractions and expansions of the conduit where it is attached thereto by means 8. In part this occurs because the end of the sleeve will be near the temperature of the conduit and will freely contract or expand with the conduit with temperature changes and in part, this result is accomplished because the proportions of the sleeve give it some flexibility at the end attached to the conduit. Stresses produced are to some extent absorbed through the length of the sleeve rather than in the conduit or container wall, thereby reducing the stresses in these members. While the proportions of the sleeve are not critical, if the sleeve is too short and too thick the most desired results are not as readily achieved.

The conduit and sleeve assembly is preferable of a thin wall construction although heavy wall construction will produce correspondingly good results. In a preferred embodiment, the present apparatus was constructed using sleeve means having a mean diameter to wall thickness of 9.5:1. Similarly, ratos of about 7:1 to 12:1 can be used with correspondingly good results.

For best results, the length of the sleeve is related to the diameter of the conduit in a ratio of more than 1:1 and more preferably, a ratio of 4:1 to about 10:1 length of sleeve to diameter of the conduit. The spacing for insulating means between the conduit and sleeve can be varied substantially with the particular end use in mind but is preferably a distance from just touching to several times the conduit wall thickness. A distance of about one half of the conduit wall thickness produces excellent results.

The embodiment of the invention illustrated in FIG. 2 is shown used with a container wall 1', heat-storage material 3' and a tubular conduit 4', as before. In this embodiment the coupling device comprises a tubular sleeve 5' surrounding the conduit 4' and leaving a space 6' therebetween. At end 7' of the sleeve there are means, such as welding, for securing and sealing the container wall to the sleeve. Similar means secure the conduit to the other end 8' of the sleeve. In this embodiment the sleeve extends to inside the container and the space formed around the conduit by the sleeve and the container wall communicates with the exterior of the container and is occupied by air from outside the container which acts as an insulative means to prevent heat from transferring rapidly from the container wall to the conduit. No high thermal stresses are thus produced at the end of the sleeve connected to the container wall or in the container wall itself. The space 6' may instead be occupied with some other insulative material if desired, such as the insulation 2' around the container. As before, the sleeve 5' follows, without unacceptable stresses, the contractions and expansions of the conduit 4' at the end secured thereto.

The following example illustrates certain preferred embodiments of the present invention. Unless otherwise indicated, all parts and percentages used herein are by weight and all temperatures in the examples and claims are in degrees Fahrenheit.

*Example*

A heat storage apparatus was constructed having a heat exchange conduit therein constructed in accordance with the present invention in the embodiment of FIG. 1. The conduit used was of mild steel having an outside diameter of one inch. A five inch mild steel sleeve was attached to the heat storage container wall having an inside diameter of 1$\frac{1}{16}$ inches and an outside diameter of 1$\frac{5}{16}$ inches. The sleeve was attached at the end extending away from the heat storage container to the conduit. This construction resulted in a conduit means diameter to wall thickness ratio of 9.5:1.

The heat storage container was filled with a composition comprising about 89 percent sodium hydroxide, eight percent sodium nitrate and about 2 percent sodium chloride. This composition was heated to about 900 degrees Fahrenheit and the heat subsequently extracted by passing water, at a temperature of 50 to 70 degrees Fahrenheit into the conduit, forming steam and subsequently condensing the steam. The unit of FIG. 1 was subjected to about 20,000 thermal shocks and the unit of FIG. 2 was subjected to about 30,000 thermal shocks. On subsequent examination both units were found to be without defects or structural failure.

It should be understood that the present disclosure is for the purpose of illustration only and that this invention includes all modifications and equivalents which fall within the scope of the appended claims.

What is claimed is:

1. In a heat storage apparatus comprising a container of high thermal conductivity housing a heat storage material of low thermal conductivity relative to said container and a conduit of high thermal conductivity into which a heat exchange fluid is introduced at a low temperature relative to said heat storage material, said conduit entering said container at a point below the level of said heat storage material and extending through said container and said heat storage material, the improvement which comprises coupling means comprising a tubular sleeve surrounding said conduit, said sleeve being radially flexible, substantially rigid longitudinally and attached and sealed to the container at one end and to the conduit at the other end at a distance from the container at least equivalent to the diameter of said conduit, said sleeve forming a space around said conduit and insulative means in said space.

2. Apparatus according to claim 1 wherein said sleeve extends outside said container, said space communicates with the interior of said container, and said insulative means comprises said low-conductivity heat-storage material.

3. Apparatus according to claim 1 wherein said sleeve extends inside said container, said space communicates with the exterior of said container, and said insulative means comprises air.

4. The apparatus of claim 1 wherein the sleeve and conduit are of mild steel.

5. The apparatus of claim 1 wherein the ratio of the length of the sleeve to the diameter of the conduit is about 4:1 to 10:1.

6. The apparatus of claim 1 wherein the ratio of conduit means diameter to wall thickness is about 7:1 to 12:1.

References Cited

UNITED STATES PATENTS

| 2,388,177 | 10/1945 | Patterson et al. | 285—133 XR |
| 2,825,463 | 3/1958 | Thomas. | |
| 3,183,967 | 5/1965 | Mettenleiter et al. | 165—83 |

FOREIGN PATENTS

| 538,155 | 3/1957 | Canada. |
| 66,814 | 5/1948 | Denmark. |
| 1,026,716 | 4/1953 | France. |

ROBERT A. O'LEARY, *Primary Examiner.*

M. A. ANTONAKAS, *Assistant Examiner.*